Sept. 4, 1923.
V. L. HOLT
STUMP PULLER
Filed May 2, 1922
1,467,161
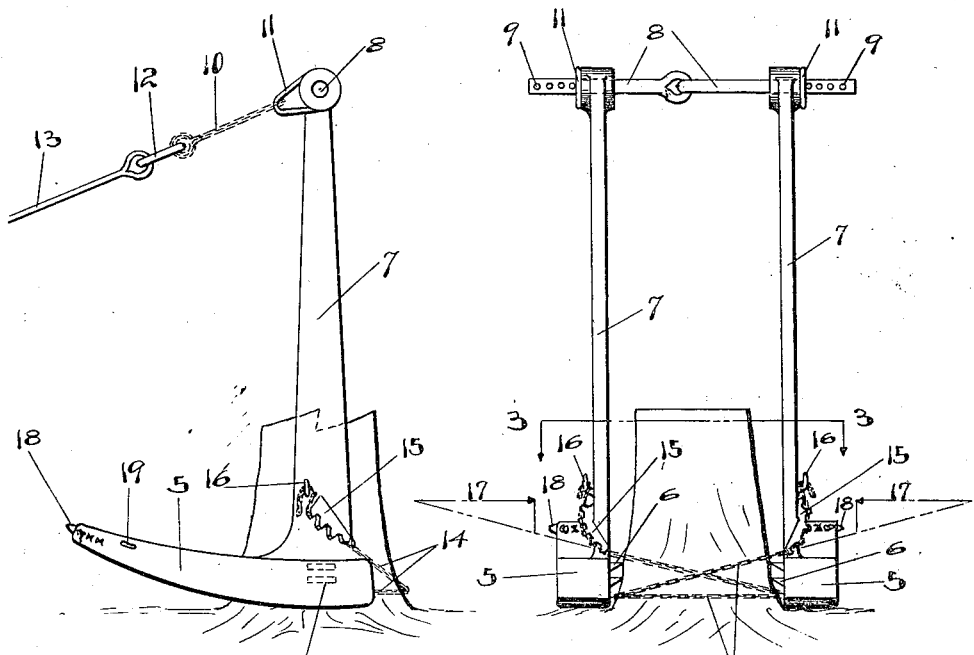
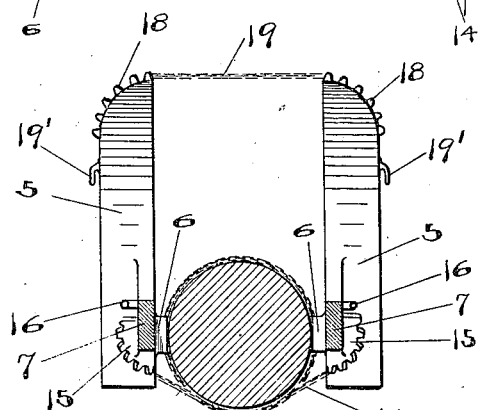
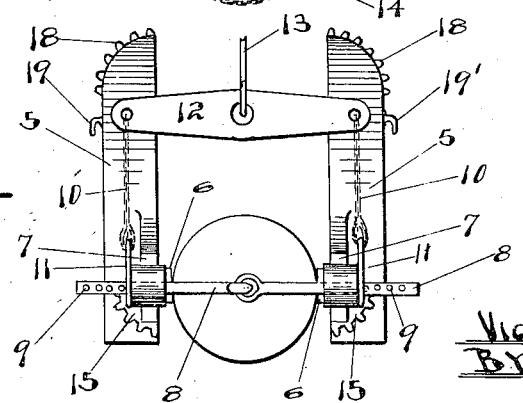

Patented Sept. 4, 1923.

1,467,161

UNITED STATES PATENT OFFICE.

VICTOR L. HOLT, OF PORTLAND, OREGON.

STUMP PULLER.

Application filed May 2, 1922. Serial No. 557,827.

*To all whom it may concern:*

Be it known that I, VICTOR L. HOLT, a citizen of the United States, residing at Portland, county of Multnomah, State of Oregon, have invented a certain Stump Puller, of which the following is a specification.

My invention is a device for pulling stumps in land clearing operations, the object being to provide such a device of great initial leverage, that will increase its grip upon the stump as the force used upon the device increases, and that will be especially adapted for land clearing operations carried on by means of a tractor or the like.

I accomplish the above object by means of the construction illustrated in the accompanying drawing, which is a part of this application for Letters Patent, like characters of reference indicating like parts throughout the several views thereof, and in which:

Fig. 1 is a side elevation of my device.

Fig. 2 is a front elevation of the same.

Fig. 3 is a sectional plan upon line 3—3 of Fig. 2.

Fig. 4 is a plan view.

In general my device consists of a pair of rockers with vertically disposed arms thereon, means for attaching said rockers upon a stump with the stump therebetween, and means for rotating the device upon said rockers.

The rockers 5 are adapted to be placed upon the ground adjacent the stump with the latter therebetween, and each arm is provided with suitable teeth 6 for engaging the stump. The arms 7 are integral with their respective rockers, and are connected at their upper ends by a pair of linked rods 8, said rods being provided with a series of holes 9 through which pins may be passed to space the arms as desired, and to suit the diameter of the stump. A bail is provided composed of flexible members 10 connected to said rods 8 by links 11, and terminating at the ends of an equalizer 12, as shown in Fig. 4. A suitable flexible member such as a rope 13 is connected to the center of said equalizer, which rope is manipulated by a tractor or the like to rotate the arms and their respective rockers. The coaction of the equalizer and the linked rods at the top of the arms 7 enables each arm to rotate upon its respective rocker 5 through a limited movement independent of the opposite arm and its rocker, thus accommodating the device to such inequalities of ground as is usually encountered around stumps.

To secure the device to the stump I provide a chain 14 to be looped around the stump, and then secured to the arms upon each side thereof by fitting the links of said chain upon the teeth of toothed quadrants 15 which quadrants are secured upon the arms 7 in inclined positions, as shown in Figs. 1 and 2. Suitable hooks 16 are provided for holding the ends of the chain 14.

It will be obvious that the upward force derived from rotating the device upon the rockers 5 will result in oppositely disposed component horizontal forces 17, as shown in Fig. 2, due to the inclination of the quadrants 15 and the connecting ends of the chain 14. Said horizontal component forces cause the teeth 6 to engage the stump in direct proportion to the intensity of the upward pull of the device.

From Fig. 3 it will be obvious that the force upon the chain 14 will cause spreading of the rear ends of the rockers unless this is prevented, and for such prevention I provide the rear end of each rocker with suitable teeth 18, and a chain 19 adapted to be passed between the ends of the rockers 5 and placed upon the teeth 18, and hooks 19 upon which to place the ends of said chain.

The entire device is very flexible, being adaptable to any size and conformity of stump by means of the linked rods 8 with their adjusting pins 9, the equalizer 12, and the rocker chain 19.

My invention may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is.

1. In a stump puller: a pair of rockers; an arm upon each of said rockers; equalizing mechanism connecting the extremities of said arms; teeth upon said arms; a chain adapted to embrace the stump and to engage with said teeth; and means to enable said rockers to grasp the stump therebetween.

2. A pair of armed and rockered members adapted to be placed with a stump therebetween; equalizing mechanism connecting said arms; and a flexible member connecting said rockers and adapted to embrace said stump.

3. A pair of rockers adapted to grasp a stump therebetween; means to rotate said rockers; and means to cause said rockers to grasp the stump therebetween with a force directly proportional to the rocking force.

4. In a stump puller: rockers, means to operate said rockers; and means, operable from said former means, to cause said rockers to grasp a stump therebetween.

5. In a stump puller: a pair of rockers; an arm upon each of said rockers; inclined toothed quadrants upon each of said arms; and a chain adapted to engage said quadrants and to embrace the stump.

6. In a stump puller: a pair of rockers adapted to engage a stump therebetween; teeth upon one end of each of said rockers; a chain adapted to engage said teeth and thus connect said rockers; and means to operate said rockers.

7. In a stump puller: a pair of rockers adapted to engage a stump therebetween; an arm upon the forward end of each of said rockers; inclined toothed quadrants upon each of said arms; a chain adapted to engage said quadrants and to embrace the stump; teeth upon the rearward end of each of said rockers; a chain adapted to engage said teeth and thus connect said rockers; and equalizing mechanism connecting the extremities of said arms, whereby to operate the device.

In witness whereof I claim the foregoing as my own I hereby affix my signature in the presence of two witnesses, at Portland, county of Multnomah, State of Oregon, this 26th day of April, 1922.

VICTOR L. HOLT.

Witnesses:
   L. J. ROBINSON,
   C. F. BLAKE.